APPARATUS FOR PHOTOGRAPHICALLY PRINTING ON FILM

Filed May 19, 1960 3 Sheets-Sheet 1

INVENTOR.
JOHN A. MAURER
BY Howe and Nydick
ATTORNEYS

APPARATUS FOR PHOTOGRAPHICALLY PRINTING ON FILM

Filed May 19, 1960 3 Sheets-Sheet 2

INVENTOR.
JOHN A. MAURER
BY Hane and Nydick
ATTORNEYS

APPARATUS FOR PHOTOGRAPHICALLY PRINTING ON FILM

Filed May 19, 1960 3 Sheets-Sheet 3

INVENTOR.
JOHN A. MAURER
BY Hane and Nydick
ATTORNEYS

United States Patent Office 3,094,057
Patented June 18, 1963

3,094,057

APPARATUS FOR PHOTOGRAPHICALLY PRINTING ON FILM

John A. Maurer, 116 W. 29th St., New York, N.Y.

Filed May 19, 1960, Ser. No. 30,314
6 Claims. (Cl. 95—75)

The present invention relates to apparatus for photographically printing picture and sound record areas on a strip of film.

More specifically, the invention relates to a printing apparatus for positive printing of a succession of alternate, longitudinally spaced picture and sound record or message areas on a strip of film.

On film strips of this kind, each of the picture areas is associated with a sound record area in that the subject matter depicted in the picture area and the message recorded on the associated sound record area are related, and each pair thus formed constitutes a program. The picture area and the sound record area of a program may or may not be directly adjacent to each other and more often they are not but on the entire strip of film, the same longitudinal spacing between each picture area and the associated sound record area must be maintained.

Film strips of the kind above referred to are designed for projection accompanied by sound by means of sound projectors arranged to project, while the film is stationary, the picture area of each program and simultaneously reproducing the message recorded on the associated sound record area. In other words, the picture area is projected in the manner of a still photograph. Sound projectors of this kind are described, for instance, in my co-pending application Serial No. 779,676 filed December 11, 1958, now Patent No. 3,001,030.

The broad object of the invention is to provide a novel and improved printing apparatus by means of which successive programs of the general kind above referred to can be printed in continuous operation on a strip of film stock of practically any useful length.

A more specific object of the invention is to provide a novel and improved printing apparatus for printing a sequence of pairs of picture areas and sound record areas on a strip of film stock and feeding a new section of film stock to be printed upon after the completion of each printing operation.

Another more specific object of the invention is to provide a novel and improved apparatus which will print on a sensitized strip of film stock a sequence of positive prints of pairs of a picture area and a sound record area combined from two negative films, one negative film bearing longitudinally spaced picture areas and the other longitudinally spaced sound record areas only, and which will feed sections of the film stock and of the two negative films through the apparatus spatially correlated so that the respective negative film sections and sections of the film stock are guided into the apparatus in a superimposed relationship when in the printing position for the simultaneous printing of the two areas of each program.

A still more specific object of the invention is to provide a novel and improved printing apparatus, the printing and transport functions of which are automatically controlled in accordance with the required sequence.

Other and further objects, features and advantages of the invention will be pointed out hereinafter in the appended claims forming part of the application.

In the accompanying drawing, a preferred embodiment of the invention is shown by way of illustration and not by way of limitation.

Referring first to FIGS. 1 through 4, FIG. 1 shows a strip of film 1, generally of a negative film bearing sound track areas 2. The sound track areas are longitudinally spaced from each other by blank strip portions 3. The message or intelligence is recorded in each sound record area by substantially longitudinally extending record lines parallel to each other and slightly inclined in reference to the longitudinal edges of the film. Continuous sound reproduction can be obtained from such record lines when the respective sound record area is brought into a cylindrically curved configuration having its axis transverse of the length of the film. Sound record areas of this kind are more fully described in my co-pending application Serial No. 779,676, filed December 11, 1958, now Patent No. 3,001,030.

Figure 1:
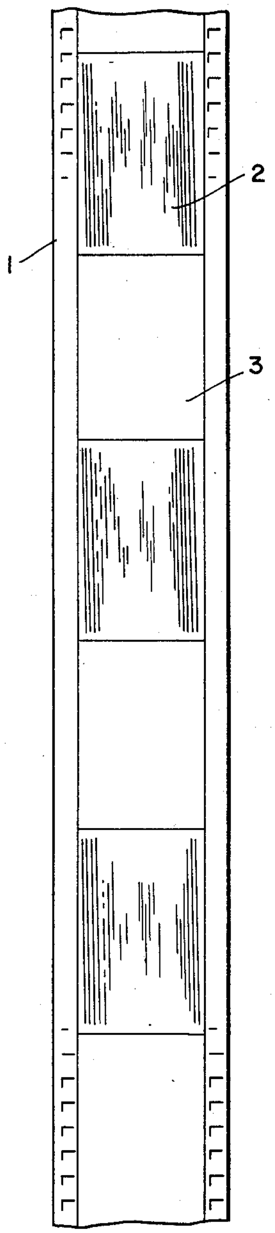
FIG. 1 shows part of a film bearing sound record areas only.
Figure 2:
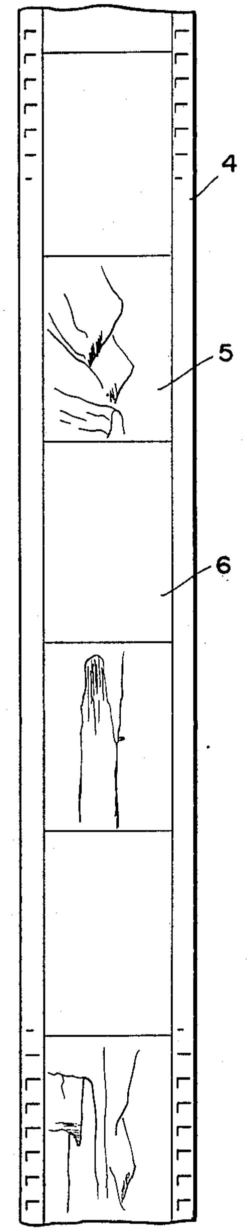
FIG. 2 shows part of a film bearing picture areas only.

FIG. 2 shows a strip of film 4 bearing picture areas 5 alternating with blank spaces 6. Film strip 4 may also be visualized as a negative film and as will be observed, the blank areas 3 of film 1 match the picture areas 5 of film 4 and vice-versa. Either film may be of any desired length.

Figure 3:
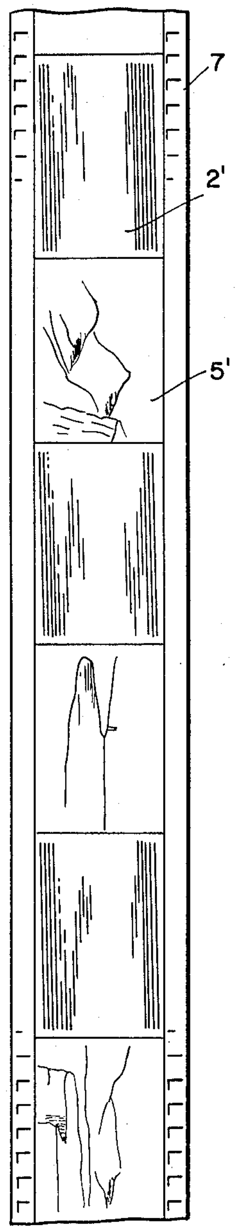
FIG. 3 shows part of a film printed from the films according to FIGS. 1 and 2.

FIG. 3 shows a strip of film 7 bearing sound record areas 2' and picture areas 5'. The strip of FIG. 3 is produced by printing on the film the sound record areas and the picture areas respectively of FIGS. 1 and 2 so that they appear consecutively on film 7. Film 7 should be visualized as a standard film prepared with a sensitized emulsion layer which is processed after printing in the usual manner.

Figure 4:
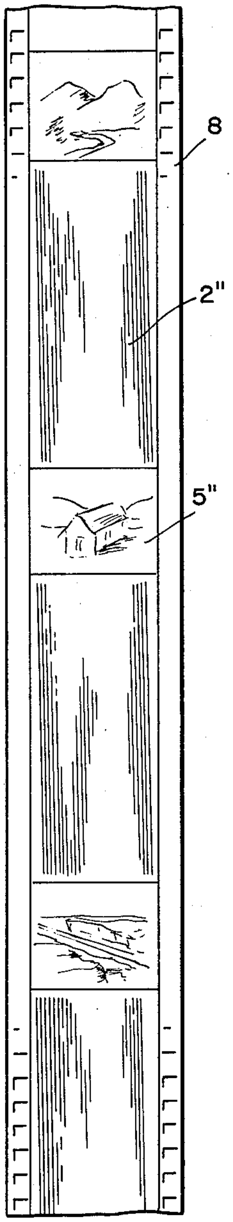
FIG. 4 shows a printed film modified in that each sound record area occupies an area of different size than the picture areas.

FIG. 4 shows a film strip 8 which corresponds to film strip 7 except that in FIG. 4 each sound record area 2'' occupies a longer portion of the film than the associated picture area 5'' whereas in FIG. 3 both the picture area and the sound record area occupy the same length of the film.

Figure 5:
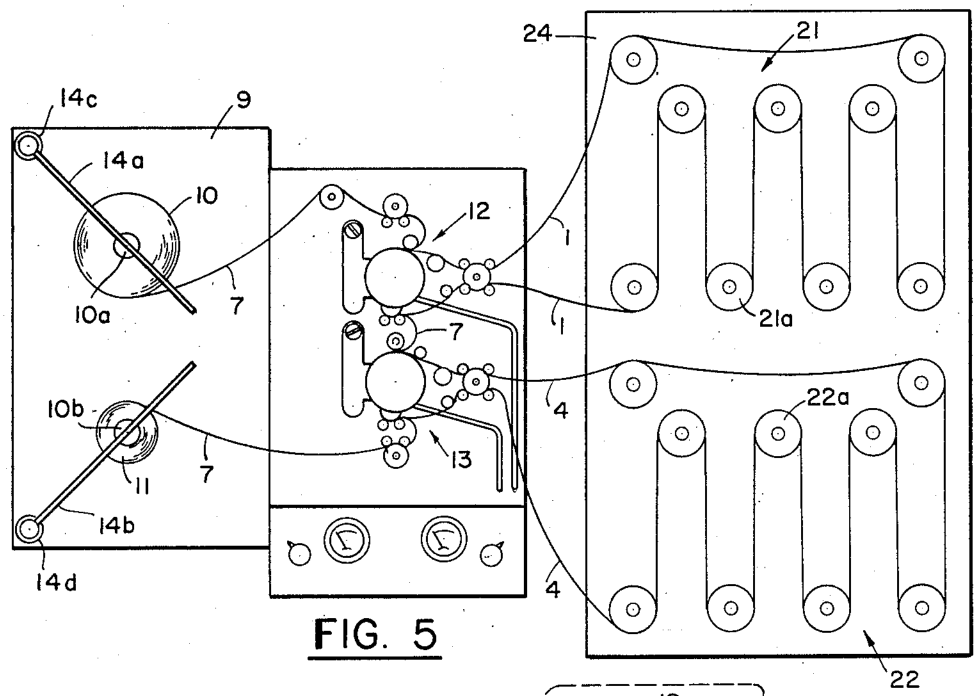
FIG. 5 is an elevational front view of a printing apparatus according to the invention.
Figure 6:
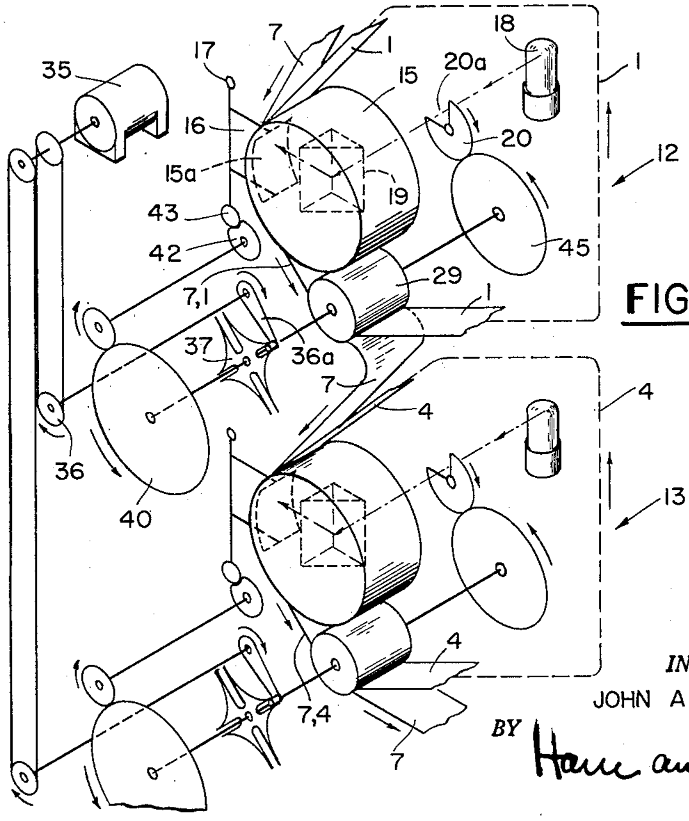
FIG. 6 is a perspective view diagrammatically showing the optical assemblies and the transport means of the printing apparatus.

Referring now to FIGS. 5 through 9 and first to FIG. 5, the printing apparatus according to the invention as shown in FIG. 5, occupies a supply reel 10 for film 7 to be printed upon. Printing stock 7 is wound upon a take-up reel 11. Film 7 is first guided to a first printing station generally designated by 12 and then guided to a second printing station generally designated by 13. While film 7 passes through printing station 12, the sound record areas 2 on film 1 are printed upon the film and while film 7 passes through printing station 13, the picture areas 5 on film 4 are printed upon the film. All three films, 1, 4 and 7, are stationary while the printing is effected and upon completion of each printing operation all three films are transported through distances such that a succeeding sound record area and a succeeding picture area are brought into printing relationship with a fresh section of film 7. As is evident, the spatial relationship of printing stations 12 and 13 and the control of the film transport must be such that the composite printing of FIG. 3 or 4 is effected on the film strip to be printed upon.

Supply reel 10 and take-up reel 11 are supported by spindles 10a and 10b respectively which have their bearings in a plate 9. Spindle 10b which carries the take-up reel, may be driven through a friction clutch in a manner well known in the art to take up the film continuously as it emerges from the printing mechanism. Arms 14a and 14b, supported on pivots 14c and 14d, hold the rolls of film 1 in place on their supports while the machine is in operation. Pivots 14c and 14d may have conventional detents which hold the arms in the positions shown in the drawing except when they are swung out of the way in order to place rolls of film on the spindles.

Film 1 is in the form of an endless loop and guided on a film tree generally designated by 21 as is shown in the figure. A number of guide rolls 21a are provided and as is evident, any practically useful length of film stock 1 can be accommodated by providing an adequate number of rolls 21a.

Film 4 is similarly guided on a film tree 22 and more specifically on guide rolls 22a. All the guide rolls are conveniently mounted on a plate 32, but any other suitable guidance and storage for films 1 and 4 may, of course, also be provided.

*Printing Stations*

The two printing stations 12 and 13 are alike and only the station 12 wil be described in detail. Station 12 serves to print the sound record areas 2 on film 1 on film stock 7, but of course it could also be used to print the picture areas 5 on film 4 on the film stock. The printing station comprises a stationarily mounted drum 15 having in its wall an aperture 15a outlining the area to be printed. The aperture can be covered and uncovered respectively by a pressure block 16 supported by a lever 16a about a pivot pin 17. The lever is biased by suitable means, such as springs, into the position closing the aperture. This position is shown in FIGS. 5 through 9. Film 1 and film stock 7 are guided over drum 15 and past its operture 15a in superimposition as is shown in the figures. As is evident, pressure block 16, when in the position shown, will not only cover the aperture, but also press the respective portions of film 1 and 7 against the drum wall thereby establishing good printing contact between the film stock 7 and negative film 1. The sound record area in front of the aperture 15a is printed upon the respective portion of film stock 7 while the respective two film portions are held stationary at this time in the cycle. Printing is effected by means of light derived from a suitable light bulb 18 and deflected by a light deviating means shown as a prism 19 upon the aperture. A shutter 20 diagrammatically indicated as a rotary notched disc, is interposed between bulb 18 and prism 19. As is evident, shutter 20 will obturate the light from the bulb in any position other than the position shown in which its notch 20a is in alignment with the light. It has been found advantageous to build up a slightly elevated pressure within the drums during the exposure of film stock 7 for the purpose of pressing the superimposed film portions 1, 7 and 4, 7 respectively against each other and the pressure block further to assure good contact printing. The pressure may be produced by connecting to the interior of the drums, pipes 50 and 51 respectively which should be visualized as being connected to an appropriate source of pressure air.

*Film Transport Means and Printing Control Means*

The incoming film stock 7 is guided over a sprocket 25 against which it is held by idlers 26 and 27 and it is then guided by means of an idler 28 over part of the circumference of the drum including the picture aperture. The film is then guided over a sprocket 29 against which it is held by idlers 30 and 31. After leaving sprocket 29, the film passes to the second printing station 13 through which it is guided in the same manner as has been described for printing station 12. Film 1 is guided directly to drum 15 and joins film stock 7 during its passage over part of the circumference of the drum. Film 1 separates from film stock 7 when the two films leave sprocket 29. Film 1 is then returned to the film tree 20 as is clearly shown in the figures.

Similarly, film 4 joins film stock 7 during the passage of the two films over the drum of the second printing station.

The film transport and the control of the optical means, including actuating of shutter 20 and pressure blocks 16, are effected by means of a common drive means shown as a motor 35. Motor 35 drives the input sprocket 25 and a similar output sprocket 25a thereby pulling film stock 7 through the entire machine. The motor further drives a disc 36 disposed coaxially with drum 15 but rotary in reference thereto. Disc 36 is the input member of a Geneva drive and has for this purpose a nose 36a mounting a pin 36b. Pin 36b coacts with the radial slots 37a of a rotary Geneva wheel 37. As is apparent, rotation of disc 36 will effect a step-by-step rotation of Geneva wheel 37 as pin 36b engages and leaves successive slots 37a. Disc 36 is formed with a notch 36c to permit passage of Geneva wheel 37 in front of the disc when the two parts rotate in reference to each other. A gear 40 is mounted on the same shaft with the Geneva wheel to effect rotation of the gear as the Geneva wheel is rotated. Gear 40 is in mesh with a second gear 41. On the same shaft with gear 41 a cam disc 42 is fixedly mounted. The cam disc coacts with a follower 43 on pressure block 16. As can be clearly seen in FIG. 7, the pressure block can occupy its clamping position only when follower 43 occupies the detent in the camming surface of cam disc 42. In any other rotational position of disc 42, the pressure block 16 will be forced away from the drum so as to permit feeding of the films under the blocks.

The shaft mounting Geneva wheel 37 further mounts a gear 45 which is in mesh with shutter disc 20, thus imparting rotation to the shutter when the Geneva wheel is driven.

Figure 7:
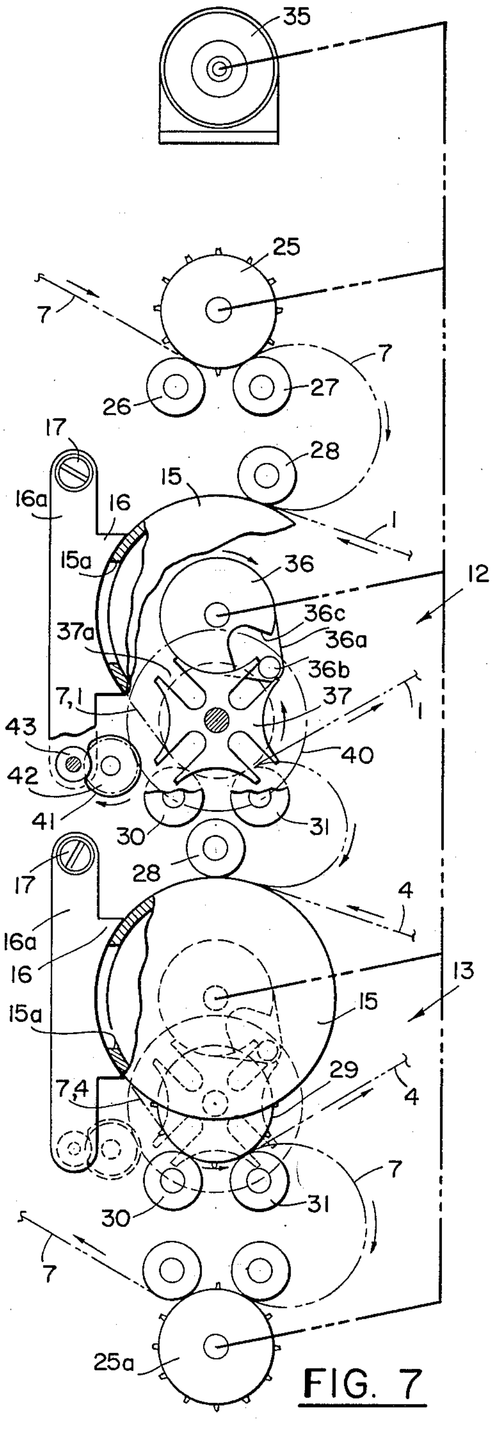
FIG. 7 is another diagrammatic view of the transport equipment of the printing apparatus and also of the control arrangement of the apparatus.

The transmission means by which motor 35 is coupled with the respective driven components are diagrammatically shown in FIG. 5 as drive belts and in FIG. 7 by dotted lines.

As has been previously explained, the operation of the printing machine requires that when a sound record area 2 on film 1 is aligned with the sound printing aperture of printing station 12, the associated picture area 5 on film 4 must be simultaneously aligned with the sound picture printing aperture of printing station 13 and the portions of film 7 in registry with the apertures must be so spaced that they will accommodate the two areas to be printed at the appropriate longitudinal spacing. In this connection, it should be pointed out that the picture area and the associated sound record area are generally not printed on film 7 directly adjacent to each other, but there may be one or several interposed picture areas and sound record areas belonging to other programs. However, it is essential that the same longitudinal spacing is maintained between each picture area and the associated sound record area.

It is further essential that after the completion of the printing of the picture area and the sound record area aligned with the apertures of the drums, all three films are moved through distances such that a new picture area and a new sound record area are aligned with the respective apertures and that portion of film 7 of appropriate length has been moved into superimposition with the picture and sound record areas now aligned with the apertures.

The aforedescribed correlation of the film transport and the actual printing operation by exposing the respective portion of film 7 can be readily effected by selecting appropriate ratios of transmission and disposing the printing stations at suitable spatial distances.

Figure 8:
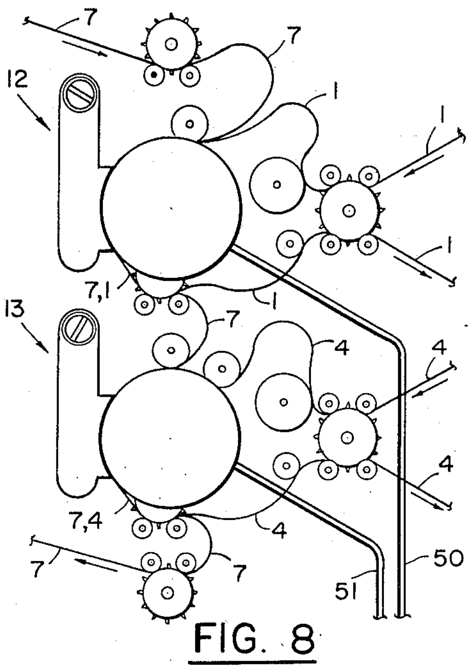
FIG. 8 is a diagrammatic view of the apparatus just ready to perform a printing operation.
Figure 9:
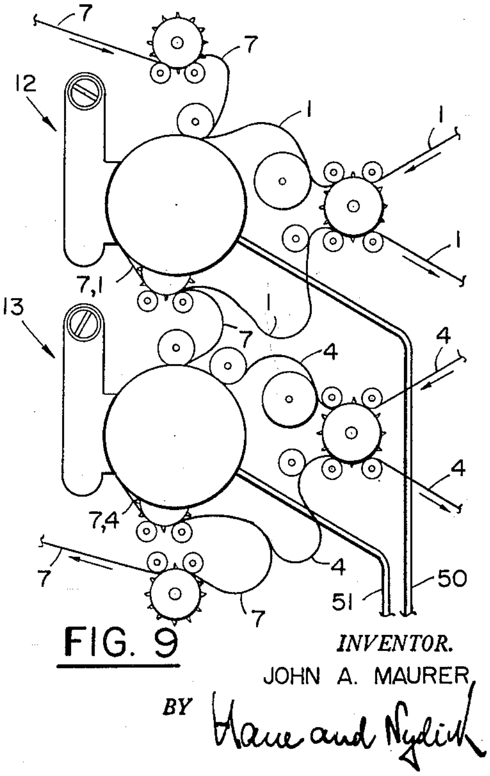
FIG. 9 shows the apparatus after the printing operation of FIG. 8 has been completed and a new section of the film to be printed upon has been moved into position.

The operation of the printing machine as hereinbefore described is as follows:

Let it be assumed that all three films have been threaded through the machine as can best be seen in FIGS. 5, 8 and 9. The threading must be so effected that initially the first picture area and sound record area are correctly aligned with their respective apertures and appropriate lengths of film stock 7 to be printed upon are in superimposition with the aligned areas on films 1 and 4. Correct alignment can be effected by means of a suitable gauge on which are marked the lentghs of the film that have to be threaded into the machine in order to allow a smooth passage of the films through the machine and with the correct space relationships.

Motor 35 is continuously driving during the entire printing operation. As a result, film stock 7 is continuously fed into the machine and withdrawn therefrom and similarly, films 1 and 4 are continuously fed into the machine and withdrawn therefrom. As previously mentioned, all three films are held stationary by the Geneva mechanism and pressure blocks 16 when and while the respective portions of film 7 are exposed.

FIG. 8 shows the condition just after an exposure has been made and the machine is ready for transport. Accordingly, all three films have been held stationary as the Geneva drive is not feeding the films at this time in the cycle and the superimposed film portions are held in in pressure contact for an interval of time and as a result, the continued transport of all three films has built up wide loops ahead of both drums as is indicated in FIG. 8. The loops behind the drums formed by films 1 and 7 or 4 and 7, are at a minimum due to the withdrawal of the films during the printing operation as also shown in FIG. 8.

FIG. 9 shows the position of the films just after transport, that is, an exposure has been made, pressure blocks 16 have been withdrawn and the Geneva drive has moved all three films and finally it has caused the pressure blocks to return into the clamping position to ready the printing machine for the next exposure. The wide loops shown in FIG. 8 ahead of the drums are now formed behind the drums and the loops ahead of the drums are at a minimum, but will be built up again during the actual printing operation. At the same time, the wide loops behind the drums will be gradually flattened as the films are returned to the respective storage reels.

The hereinbefore described cycle is continuously repeated until all the desired picture and sound record areas are printed on the film stock 7.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. An apparatus for photographically printing on a strip of sensitized film successive uniformly spaced, longitudinally alternating picture areas and audible message areas, said apparatus comprising a pair of contact printing means each including a shutter means, first film transport means for transporting a first strip of film sequentially past both said printing means, said first film strip being the strip to be printed upon, second film transport means for transporting a second strip of film bearing longitudinally spaced apart picture areas past one of said printing means in superimposition with the first film strip while both film strips pass said one printing means, third film transport means for transporting a third film strip bearing longitudinally spaced audible message areas past the other one of said printing means in superimposition with the first film strip while both said first and said third film strip pass said other printing means, said printing means being spaced apart by a distance corresponding to the longitudinal spacing of said areas on the second and the third film strip, each of said picture areas being associated with one of said message areas, printing control means actuating sequentially both said shutter means for simultaneously printing a picture area and an audible message area respectively upon the first film strip while all three film strips are stationary, and said film transport means for moving all three film strips through predetermined respective distances upon completion of the printing of both areas to place said film strips in respective positions in which a succeeding picture area and the associated audible message area on the second and the third film strip respectively are in superimposition with a succeeding portion of the first film strip for repeating the aforesaid printing cycle, and common drive means drivingly coupled with said transport means for driving the same continuously to effect continuous transport of all three films, and a pressure means associated with each of said contact printing means, each of said pressure means being movable between a pressure position holding stationary and in pressure contact superimposed film portions in front of said printing means and a release position releasing said held film portions for transport, said printing control means controlling the positions of both said pressure means to effect sequential movement thereof into said pressure position when and while said shutter means are actuated for printing and then into said release position for transport of the film strips through said predetermined distances.

2. An apparatus according to claim 1 wherein said printing control means comprise transmission means having a ratio of transmission such that the transport means transport said films through the respective predetermined distances between each two releases of said pressure means by the control means.

3. An apparatus according to claim 2 wherein each of said contact printing means comprises a drum having a smooth peripheral surface and including an aperture for framing the film area to be printed upon, said first film being successively guided over both said drums and past the apertures thereof and said second film being guided over one of said drums and past the aperture thereof and said third film over the other of said drums and past the aperture thereof, and wherein each of said pressure means comprises a pressure block mounted movable between the pressure position covering the respective drum aperture and clamping the respective film portions between the block and the respective drum to hold stationary and in contact the superimposed film portions and the release position withdrawn from the respective drum to release the respective film portions for transport.

4. An apparatus according to claim 3 wherein said transmission means comprise a Geneva drive continuously driven by said common drive means, actuating means for actuating said pressure means and actuating means for actuating said shutter means, said actuating means for the pressure means and said actuating means for the shutter being drivingly coupled with said Geneva drive for sequential actuation at predetermined time intervals.

5. An apparatus according to claim 1 wherein each of said pressure means comprises a closed drum having a smooth peripheral surface and including an aperture for framing the film area to be printed upon, said films being guided over said drums and past said apertures, a pressure block for each drum to cover the respective apertures, each of said pressure blocks being movable between a pressure position pressing against the respective drum to retain respective film portions between the block and the drum and a release position withdrawn from the respective drum, and conduit means for supplying pressure air into the drums to press superimposed film portions in registry with the apertures against each other and the respective pressure block in the pressure position of the latter.

6. Apparatus according to claim 1 wherein said transport means for the second film strip and the third film strip, respectively, each comprise guide means for guiding a film strip in the form of an endless loop past said one and said other contact printing means, respectively.

References Cited in the file of this patent

UNITED STATES PATENTS

| | | |
|---|---|---|
| 1,591,118 | Friess | July 6, 1926 |
| 1,771,029 | Burkhardt | July 22, 1930 |
| 1,828,364 | Garbutt | Oct. 20, 1931 |
| 1,904,449 | Hardy | Apr. 18, 1933 |
| 2,271,572 | Rackett | Feb. 3, 1942 |